Oct. 13, 1931.   W. JACOBS   1,827,582
VARIABLE SPEED GEAR
Filed Oct. 25, 1928   3 Sheets-Sheet 2
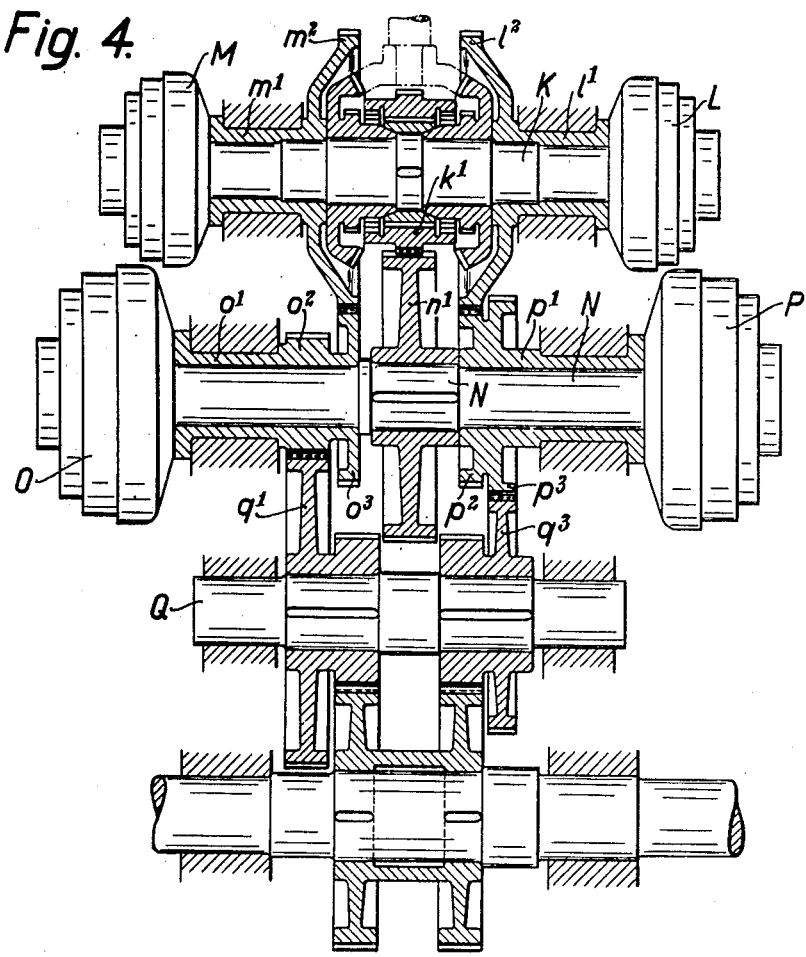
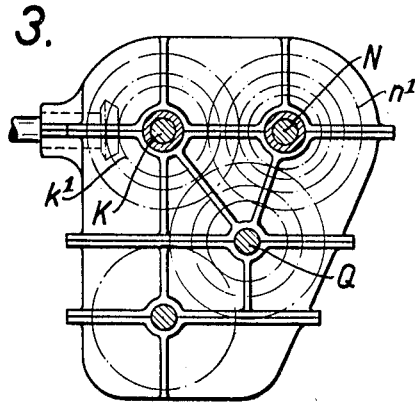

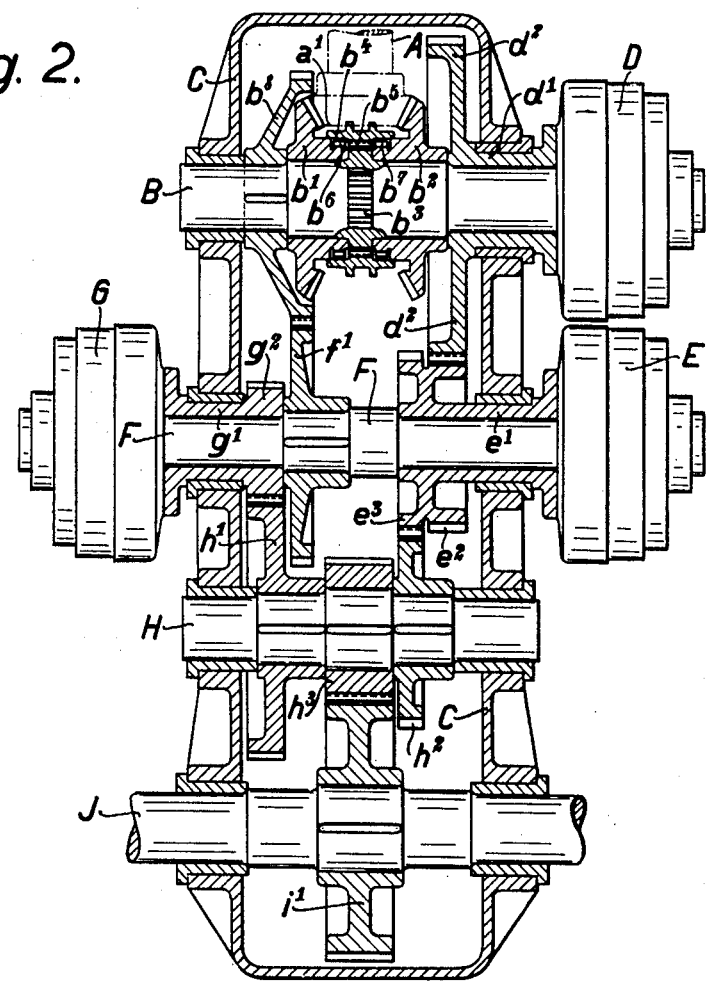
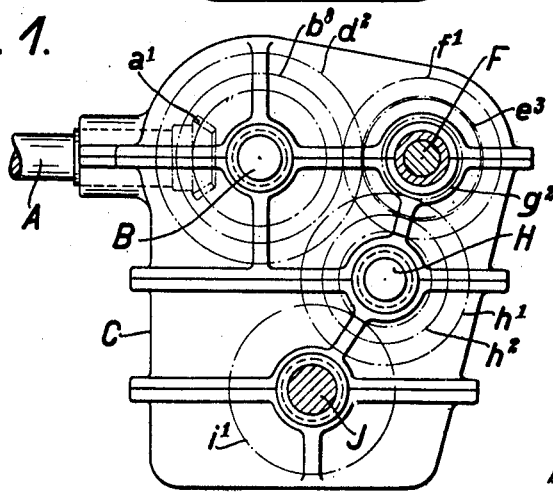

Oct. 13, 1931.  W. JACOBS  1,827,582

VARIABLE SPEED GEAR

Filed Oct. 25, 1928   3 Sheets-Sheet 3

Inventor
Werner Jacobs
By Knight Bro
atty.

Patented Oct. 13, 1931

1,827,582

UNITED STATES PATENT OFFICE

WERNER JACOBS, OF ESSEN, GERMANY, ASSIGNOR TO FRIED. KRUPP AKTIENGESELL-SCHAFT, OF ESSEN-ON-THE-RUHR, GERMANY

VARIABLE SPEED GEAR

Application filed October 25, 1928, Serial No. 315,067, and in Germany November 18, 1927.

The invention relates to variable speed gears intended to be inserted between the driving motor and the driven axles of a vehicle.

In variable speed gearing of this type it is necessary to design some of the clutches used so as to be capable to be operated during running, e. g. as friction or electric clutches, in order to allow of the individual speed steps to be interchanged during running. It is further desirable in constructions of this type to have the clutches located outside the gear casing to make them more easily accessible. The invention has for its object a gear of the type hereinbefore stated in which the transmission of the power of the motor is effected in each speed step by one sole clutch only that can be operated during running, these clutches transmitting a small turning moment only, so that they may have correspondingly small dimensions.

Figure 6:
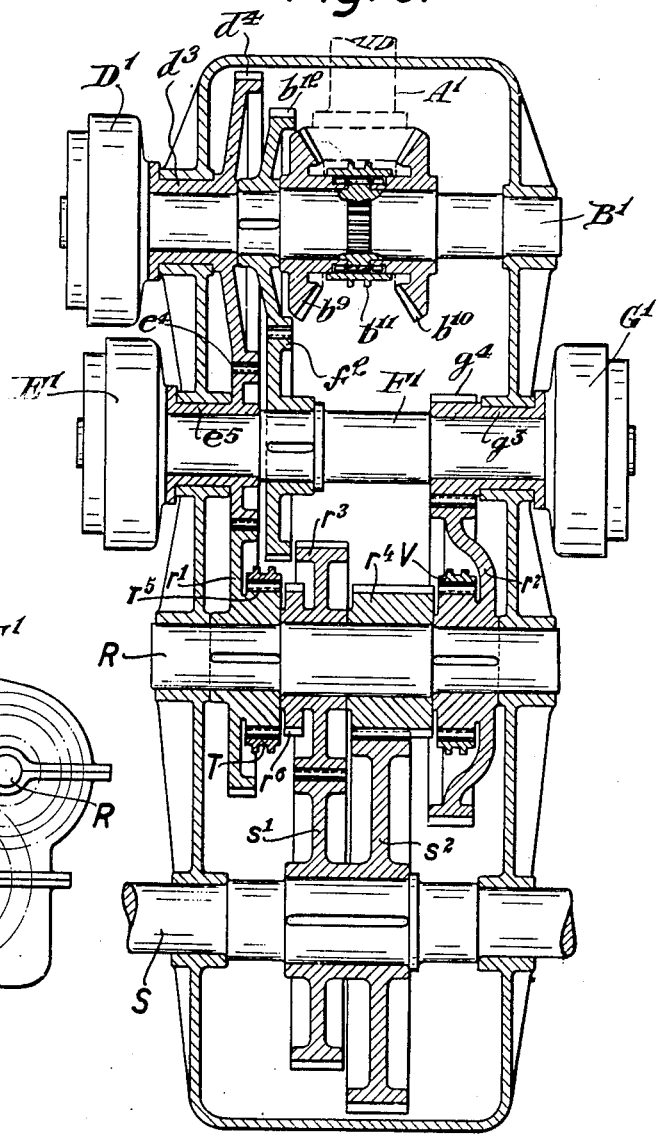
Figure 5:
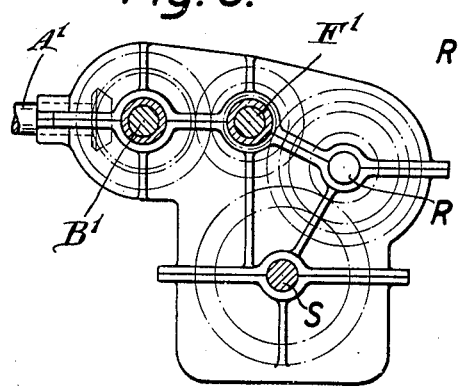

Several embodiments of the invention are illustrated by way of example in the accompanying drawings in which Figure 1 is a side elevation of the first embodiment of the invention, Figure 2 shows on an enlarged scale a development flattened out into one plane and in axial section, of this gear, Figure 3 is a view similar to Figure 1, of another embodiment, Figure 4 is a development thereof similar to that of Figure 2, and Figures 5 and 6 are views similar, respectively, to Figures 1 and 2, of a third embodiment of the invention.

Referring first to the embodiment shown in Figure 1, A denotes the motor shaft which projects into the casing C of the variable speed gear and carries on its free end a bevel wheel $a^1$ permanently in mesh with two bevel wheels $b^1$ and $b^2$ loose on an intermediate shaft B. The latter is mounted for rotation in the casing C and carries a rim of teeth $b^3$ which form the one half of a toothed clutch and are permanently in mesh with corresponding teeth $b^5$ of a coupling sleeve $b^4$. The bevel wheels $b^1$ and $b^2$ carry corresponding teeth $b^6$ and $b^7$ so that the shaft B can be coupled selectively with one of the wheels $b^1$ and $b^2$ by axially shifting the sleeve $b^4$. Shaft B has further loosely mounted on it a sleeve $d^1$ which is rotatably mounted on the casing C and forms one half of a clutch D adapted to be operated during running. Sleeve $d^1$ has rigidly connected to it a spur wheel $d^2$ permanently in mesh with a spur wheel $e^2$ of a sleeve $e^1$. This latter is loosely mounted on another intermediate shaft F and forms the one half of a clutch E adapted to be operated during running. The shaft B has finally rigidly mounted on it a spur wheel $b^8$ which permanently engages a spur wheel $f^1$ fast on shaft F. The latter further carries a loose sleeve $g^1$ having integral with it a spur wheel $g^2$, this sleeve forming one half of a third clutch G adapted to be operated during running and arranged outside the casing C like the clutches D and E. The spur wheel $g^2$ of the sleeve $g^1$ is in mesh with a spur wheel $h^1$ fast on a third intermediate shaft H. The latter is rotatably mounted in the casing C and carries another spur wheel $h^2$ in mesh with a spur wheel $e^3$ integral with the sleeve $e^1$ of the clutch E. By means of toothed wheel gears $h^3$ $i^1$ the intermediate shaft H is connected to a blank shaft J which in the usual manner is coupled with the driven axles of the vehicle by coupling rods or the like.

The dimensions of the several toothed wheels entering into consideration for the different speed steps are so determined that the gear ratio of the wheels $e^3$ and $h^2$ is greater than that of the wheels $g^2$ and $h^1$ and that the gear ratio of the wheels $d^2$ and $e^2$ is greater than that of wheels $b^8$ and $f^1$.

Before starting, the bevel wheel $b^1$ or $b^2$ is coupled with the intermediate shaft B by means of sleeve $b^4$ according to the desired running direction. Thereupon the clutch G is engaged, so that B is now connected over $b^8$, $f^1$, F and G to sleeve $g^1$. The power of the motor is thus transmitted to the blank shaft J on the way $b^8$, $f^1$, F, G, $g^1$, $g^2$, $h^1$, H, $h^3$, $i^1$. When the second speed should be put in, the clutch G is disconnected and clutch E is engaged. The transmission of power then takes place by the gear $b^8$, $f^1$, F, E, $e^1$, $e^3$, $h^2$, H, $h^3$, $i^1$, the blank shaft J now being driven at a higher speed than before, as the toothed wheel $e^3$ has a larger pitch diameter than spur wheel $g^2$. In order to change over to the third, highest speed, clutch E is disengaged and clutch D engaged. The drive of the blank shaft J then takes place by the gear train $d^2$, $e^2$, $e^3$, $h^2$, $h^3$, $i^1$, the sleeve $e^1$ in this case leading with regard to the intermediate shaft F which is permanently driven by the spur wheels $b^8$ and $f^1$. It need not be set forth in detail with regard to the foregoing how to proceed in returning to a lower speed.

In contradistinction to known arrangements the transmission of power is obtained in each of the three speeds only by one of the clutches D, E, G. Besides, each of these three clutches transmits approximately the same turning moment, so that they can have equal size.

In the embodiment shown in Figures 3 and 4 four different speeds are obtainable. The first intermediate shaft K which is driven in the same manner as the corresponding shaft B of the first embodiment, has loosely mounted on it two sleeves $l^1$ and $m^1$ having integral with them a spur wheel $l^2$ and $m^2$, respectively, these sleeves each forming the one half of a clutch L and M adapted to be operated during running. Another intermediate shaft N carries sleeves $o^1$ and $p^1$ of two further control clutches O and P. Shaft N is driven by a spur wheel $n^1$ in mesh with a spur wheel $k^1$ that besides is designed as a coupling sleeve. The sleeve $o^1$ of clutch O is integral with two spur wheels $o^2$ and $o^3$, the former being in mesh with a spur wheel $q^1$ of a third intermediate shaft Q whilst wheel $o^3$ is in mesh with the spur wheel $m^2$ of sleeve $m^1$. Sleeve $p^1$ of clutch P is integral with two spur wheels $p^2$ and $p^3$, the former being in mesh with spur wheel $l^2$ of sleeve $l^1$ whilst wheel $p^3$ is in mesh with a spur wheel $q^3$ fast on shaft Q. The latter is again connected to a blank shaft by means of a gear. To drive with the first speed, the clutch O is thrown-in. The transmission of power then takes place through the gear train K, $k^1$, $n^1$, N, O, $o^1$, $o^2$, $q^1$, Q. The next speed is obtained after disengaging clutch O and engaging clutch P, through the train K, $k^1$, $n^1$, N, P, $p^1$, $p^3$, $q^3$. To change over to the third speed, clutch P is disengaged again and clutch M is engaged. The transmission then takes place through the members K, M, $m^1$, $m^2$, $o^3$, $o^2$, $q^1$, Q, the sleeve $o^1$ leading with respect to shaft N. The fourth, highest speed is obtained by means of the clutch L and the gear train K, L, $l^1$, $l^2$, $p^2$, $p^3$, $q^3$.

In this embodiment too only one control clutch is required for each speed and the clutches of the different intermediate shafts can have equal dimensions.

In the third embodiment illustrated in Figures 5 and 6 the intermediate shafts are driven in the same manner as in the first embodiment. The driving shaft A' carries a bevel gear permanently in mesh with two bevel wheels $b^9$ and $b^{10}$ loose on the intermediary shaft B'. Shaft B' carries a clutch $b^{11}$ of exactly the same construction as that shown in Fig. 1 to couple selectively bevel wheels $b^9$ and $b^{10}$ to the shaft B'. Loosely mounted on shaft B' is a sleeve $d^3$ connected to one half of the clutch D' and carrying a spur wheel $d^4$ permanently in mesh with a spur wheel $e^4$ of a sleeve $e^5$ loosely mounted on shaft F'. Sleeve $e^5$ is connected to one half of the clutch E'. Shaft F' also has a spur wheel $f^2$ fast thereon, which engages a spur wheel $b^{12}$ fast on shaft B'. Shaft F' further carries a sleeve $g^3$ connected to one half of the clutch G' and loosely mounted on shaft F'. Sleeve $g^3$ carries a spur wheel $g^4$ in mesh with a spur wheel $r^2$. It will be noted that practically the only change thus far over the structure shown in Fig. 1 is a relocation of parts and a combining of the spur wheels $e^2$ and $e^3$ into a single spur wheel $e^4$. The operation of the part just described is exactly the same as in Fig. 1. The third intermediate shaft R carries besides the spur wheels $r^1$ and $r^2$ rigidly connected thereto, also two loose spur wheels $r^3$ and $r^4$ of different diameter in mesh with spur wheels $s^1$ and $s^2$, respectively, fast on the blank shaft S. The hubs of the wheels $r^1$ and $r^3$ carry coupling teeth $r^5$ and $r^6$, respectively, so that they can be coupled with one another by shifting an appurtenant coupling sleeve T. In the same manner the wheels $r^2$ and $r^4$ can be coupled with one another by a sleeve V.

The intermediate shaft R can be driven at three different speeds by throwing-in one of the respective three control clutches; furthermore, by selectively throwing-in either coupling sleeve T or V, six different speeds can be imparted to the blank shaft S.

What I claim and desire to secure by Letters Patent, is:—

1. In a variable speed gear of the class described a driving shaft and a driven shaft, a plurality of intermediate shafts arranged between said driving and driven shaft, clutches mounted on the first two intermediate shafts and adapted to be operated during running, a toothed wheel rigid on the one half of each of these clutches and adapted to be coupled with its intermediate shaft by said clutch, the halves of the clutches of the second intermediate shaft being in direct permanent gear connection with the clutch halves of the preceding intermediate shaft at least one of the halves of each of the clutches of said second intermediate shaft being also in direct permanent gear connection with the next intermediate shaft, and a variable gear connection between said next intermediate shaft and said driven shaft and means for selectively throwing-in the speed-varying members of said connection.

2. In a variable speed gear of the class described a driving shaft and a driven shaft, a plurality of intermediate shafts arranged between said driving and driven shaft, clutches mounted on the first two intermediate shafts and adapted to be operated during running, a toothed wheel rigid on the one half of each of these clutches and adapted to be coupled with its intermediate shaft by said clutch, the halves of the clutches of the second intermediate shaft being in direct permanent gear connection with the clutch halves of the preceding intermediate shaft at least one of the halves of each of the clutches of said second intermediate shaft being also in direct permanent gear connection with the next intermediate shaft, two gear wheels of different diameter loose on said next intermediate shaft, two companion wheels fast on said driven shaft, and means for selectively coupling one of said two gear wheels with its companion wheel.

The foregoing specification signed at Cologne, Germany, this 11th day of October, 1928.

WERNER JACOBS.